(12) United States Patent
Kim et al.

(10) Patent No.: US 11,721,851 B2
(45) Date of Patent: Aug. 8, 2023

(54) BATTERY PACK

(71) Applicant: SAMSUNG SDI CO., LTD., Yongin-si (KR)

(72) Inventors: Youngil Kim, Yongin-si (KR); Daeyeop Park, Yongin-si (KR); Junhyung Lee, Yongin-si (KR); Heonhee Kim, Yongin-si (KR); Sanghyeok Ahn, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 66 days.

(21) Appl. No.: 16/770,122

(22) PCT Filed: Oct. 18, 2018

(86) PCT No.: PCT/KR2018/012340
§ 371 (c)(1),
(2) Date: Jun. 5, 2020

(87) PCT Pub. No.: WO2019/117449
PCT Pub. Date: Jun. 20, 2019

(65) Prior Publication Data
US 2020/0350530 A1  Nov. 5, 2020

(30) Foreign Application Priority Data
Dec. 12, 2017 (KR) .................. 10-2017-0170447

(51) Int. Cl.
*H01M 10/613* (2014.01)
*H01M 50/317* (2021.01)
(Continued)

(52) U.S. Cl.
CPC ....... *H01M 10/613* (2015.04); *H01M 50/209* (2021.01); *H01M 50/262* (2021.01); *H01M 50/271* (2021.01); *H01M 50/317* (2021.01)

(58) Field of Classification Search
CPC .......... H01M 10/613; H01M 10/6562; H01M 50/20; H01M 50/317; H01M 50/209;
(Continued)

(56) References Cited

U.S. PATENT DOCUMENTS 7,955,729 B2   6/2011 Onuki et al.
8,557,429 B2  10/2013 Hamada et al.
(Continued)

FOREIGN PATENT DOCUMENTS

CN   101141008 A   3/2008
CN   201185201 Y   1/2009
(Continued)

OTHER PUBLICATIONS

English Translation of JP2016157561.*
(Continued)

*Primary Examiner* — Kiran Quraishi Akhtar
(74) *Attorney, Agent, or Firm* — Lee IP Law, P.C.

(57) ABSTRACT

Provided is a battery pack, which has a reduced number of embedded components so as to have reduced cost and weight and has an efficiently adjusted internal temperature so as to have improved performance and stability, the battery packing including: a lower case including a first lower side wall extending from a bottom surface, and a second lower side wall and a third lower side wall respectively connected with the first lower side wall and arranged so as to face each other, wherein the side facing the first lower side wall is open; a battery unit accommodated in the lower case and including a plurality of battery cells; and an upper case arranged to face the lower case so as to seal the battery unit.

26 Claims, 13 Drawing Sheets

(51) Int. Cl.
*H01M 50/262* (2021.01)
*H01M 50/271* (2021.01)
*H01M 50/209* (2021.01)

(58) Field of Classification Search
CPC .. H01M 50/30; H01M 50/204; H01M 50/258; H01M 50/262; H01M 50/271; H01M 2220/20; Y02E 60/10
See application file for complete search history.

(56) References Cited

U.S. PATENT DOCUMENTS

| | | | |
|---|---|---|---|
| 8,771,862 B2 | 7/2014 | Kim et al. | |
| 9,065,111 B2 | 6/2015 | Kim et al. | |
| 9,214,650 B2 | 12/2015 | Lee et al. | |
| 9,608,244 B2 | 3/2017 | Shin et al. | |
| 9,614,208 B2 | 4/2017 | Lee | |
| 9,660,231 B2 | 5/2017 | Yoon et al. | |
| 9,786,968 B2 | 10/2017 | Lee et al. | |
| 2006/0096797 A1* | 5/2006 | Tsuchiya | H01M 10/6557 180/68.5 |
| 2008/0057393 A1 | 3/2008 | Onuki et al. | |
| 2010/0275619 A1 | 11/2010 | Koetting et al. | |
| 2011/0008659 A1* | 1/2011 | Okada | H01M 50/20 429/90 |
| 2011/0294000 A1* | 12/2011 | Kim | H01M 50/20 429/176 |
| 2012/0040229 A1 | 2/2012 | Zhu et al. | |
| 2013/0089756 A1* | 4/2013 | Kwag | H01M 50/50 429/7 |
| 2013/0089763 A1* | 4/2013 | Lee | H01M 50/342 429/71 |
| 2013/0236761 A1 | 9/2013 | Seong et al. | |
| 2013/0280565 A1* | 10/2013 | Lee | H01M 50/20 429/71 |
| 2014/0017531 A1 | 1/2014 | Uehara et al. | |
| 2014/0045006 A1 | 2/2014 | Yoon et al. | |
| 2014/0220412 A1 | 8/2014 | Lee et al. | |
| 2015/0072209 A1* | 3/2015 | Tyler | B60R 16/033 429/121 |
| 2016/0248059 A1 | 8/2016 | Katayama et al. | |

FOREIGN PATENT DOCUMENTS

| | | | |
|---|---|---|---|
| CN | 101950797 A | 1/2011 | |
| CN | 103035975 A | 4/2013 | |
| CN | 103460437 A | 12/2013 | |
| CN | 103594667 A | 2/2014 | |
| EP | 2 328 205 A2 | 6/2011 | |
| JP | 2014-500587 A | 1/2014 | |
| JP | 2016-091951 A | 5/2016 | |
| JP | 2016-154113 A | 8/2016 | |
| JP | 5960076 B2 | 8/2016 | |
| JP | 5966371 B2 | 8/2016 | |
| JP | 2016-157561 A | 9/2016 | |
| JP | 2016157561 * | 9/2016 | H01M 2/10 |
| KR | 10-2008-0022485 A | 3/2008 | |
| KR | 10-2012-0007069 A | 1/2012 | |
| KR | 10-2012-0055158 A | 5/2012 | |
| KR | 10-1146677 B1 | 5/2012 | |
| KR | 10-1125588 B1 | 6/2012 | |
| KR | 10-1156310 B1 | 6/2012 | |
| KR | 10-2012-0074375 A | 7/2012 | |
| KR | 10-1243371 B1 | 3/2013 | |
| KR | 10-2013-0039291 A1 | 4/2013 | |
| KR | 10-2013-0090339 A | 8/2013 | |
| KR | 10-1297176 B1 | 8/2013 | |
| KR | 10-2014-0037452 A | 3/2014 | |
| KR | 10-2014-0062622 A | 5/2014 | |
| KR | 10-2014-0099397 A | 8/2014 | |
| KR | 10-2015-0015136 A | 2/2015 | |
| KR | 10-2016-0132143 A | 11/2016 | |
| WO | WO 2006/087962 A1 | 8/2006 | |

OTHER PUBLICATIONS

Extended European Search Report dated Jul. 26, 2021 for corresponding EP Patent Application No. 18889344.0.
Intenational Search Report dated Apr. 1, 2019 for PCT/KR2018/012340.
Korean Office action dated Oct. 21, 2019 for KR 10-2017-0170447.
Korean Notice of Allowance dated Mar. 8, 2020 for KR 10-2017-0170447.
Chinese Office action dated Jan. 24, 2022, for corresponding CN Patent Application No. 201880075322.9.
Chinese Notice of Allowance dated Dec. 5, 2022 for corresponding CN Patent Application No. 201880075322.9.

* cited by examiner

BATTERY PACK

CROSS REFERENCE TO RELATED APPLICATIONS

This is the U.S. national phase application based on PCT/KR2018/012340, filed Oct. 18, 2018, which is based on Korean Patent Application No. 10-2017-0170447, filed Dec. 12, 2017, the entire contents of all of which are hereby incorporated by reference.

TECHNICAL FIELD

The present disclosure relates to a battery pack, which has a reduced number of embedded components so as to have reduced cost and weight and has an efficiently adjusted internal temperature so as to have improved performance and stability.

BACKGROUND ART

Secondary batteries that can be charged and discharged so as to be repeatedly used, include one battery cell so as to be used in portable small electronic devices, such as mobile phones, laptop computers, computers, cameras, and camcorders, or include a battery pack including a plurality of battery cells so as to be used as a power source for driving a motor of a high-output hybrid electric vehicle (HEV) or electric vehicle (EV).

A battery used in the HEV or EV is required to realize high output and high capacity. For this reason, a plurality of batteries are configured as a battery pack in one unit, and a plurality of such battery packs are electrically connected in series or in parallel to operate as a large capacity and high output power source.

Meanwhile, due to the characteristics of the HEV or EV, the battery pack provided therein has to be fixed so as not to be arbitrarily removed due to vibration or the like. Such a battery pack is provided as a sub-assembly of a battery cell called a module, and such an assembly is formed by combining various component parts, thereby acting as a main factor that increases the cost and weight of the battery pack. Also, in such a battery pack, the lifespan and safety of the battery cells are important, and proper temperature maintenance is essential for this. In particular, in the case of an air cooling type battery pack, the key is whether the path of the air cooling type battery pack can cool the front side of the battery cell.

DESCRIPTION OF EMBODIMENTS

Technical Problem

Provided is a structure of a battery pack, which has a reduced number of embedded components so as to have reduced cost and weight and has an efficiently adjusted internal temperature so as to have improved performance and stability.

Solution to Problem

According to an aspect of the present disclosure, a battery pack includes a lower case including a first lower side wall extending from a bottom surface, and a second lower side wall and a third lower side wall respectively connected with the first lower side wall and arranged so as to face each other, wherein the side facing the first lower side wall is open, a battery unit accommodated in the lower case and including a plurality of battery cells, and an upper case arranged to face the lower case so as to seal the battery unit.

The upper case may include a first upper side wall extending from a top surface, a second upper side wall and a third upper side wall respectively connected with the first upper side wall and arranged to face each other, a fourth upper side wall arranged to face the first upper side wall, and the first upper side wall and the lower side wall, the second upper side wall and the second lower side wall, and the third upper side wall and the third lower side wall may be arranged to be engaged with one another, and at least part of the fourth upper side wall may be arranged to face the first lower side wall.

The lower case and the upper case may be coupled to each other by using a fastening member.

The fastening member may include a first fastening member located at an end of the lower case, and a second fastening member located at an end of the upper case in a position corresponding to the first fastening member.

The second lower side wall and the third lower side wall may have a stepped shape.

A height of the second lower side wall may decrease from one side of the second lower side wall connected to the first lower side wall to the other side of the second lower side wall.

The second lower side wall may include a first area, a second area, a third area, and a fourth area in order from one side of the second lower side wall, and the first area and the third area may have a uniform height, and a first height of the first area may be greater than a third height of the third area.

The second area may have a second height, and the second height may have an inclination gradually decreasing from one side of the second area contacting the first area to the other side of the second area contacting the third area.

The fourth area may have a fourth height, and the fourth height may have an inclination gradually decreasing from one side of the fourth area contacting the third area to the other side thereof.

The inclination of the second area or the fourth area may be 35° to 55°.

A sum of a height of the first lower side wall of the lower case and a height of the first upper side wall of the upper case may be the same as a height of the fourth upper side wall of the upper case.

A sealing member may be inserted between the lower case and the upper case.

The battery pack may further include a plurality of first ribs on the bottom surface inside the lower case and a plurality of second ribs each being between the plurality of first ribs, wherein a height of the plurality of second ribs may be greater than a height of the plurality of first ribs.

Each of the plurality of battery cells may be inserted between the plurality of second ribs through forced fit and may be seated on the plurality of first ribs.

Each of the plurality of first ribs may extend in a direction in parallel with the second lower side wall or the third lower side wall.

The plurality of second ribs may be arranged at one side and the other side of the plurality of first ribs, respectively, along a direction in which the plurality of first ribs extend, and may be not arranged in a center of the plurality of first ribs.

The battery pack may further include a plurality of bus bars located on one surface of the battery unit and connecting the plurality of battery cells, and a holder unit bent to have a preset angle so as to have a first holder member and a second holder member and arranged to cover at least two surfaces of the battery unit.

The first holder member may be located on the plurality of bus bars, and the second holder member may be located on a top surface of the battery unit.

Each of the plurality of battery cells may further include a vent hole between the plurality of bus bars, and an insulating member may be between the battery unit and the first holder member of the holder unit and may include an opening located in a position corresponding to the vent hole.

The holder unit may further include a projection member in the second holder member so as to press and fix the battery unit.

The holder unit may further include a ventilation member in the second holder member so as to dissipate heat discharged from the battery unit to the outside.

A first ventilation part may be located at the first lower side wall of the lower case, a second ventilation part may be located at the fourth upper side wall of the upper case, the first ventilation part may be located at a first height based on the bottom surface, and the second ventilation part may be located at a second height that is greater than the first height based on the bottom surface.

The upper case and the holder unit may be apart from each other by a certain distance.

The battery pack may further include a pressing member located on the top surface of the upper case and protruding toward the battery unit in a first direction perpendicular to the bottom surface.

The pressing member may press the battery unit in a second direction perpendicular to the first direction by contacting the holder unit.

The battery pack may further include a support member located on a portion connecting the top surface of the upper case to the first upper side wall, being inserted into the battery unit and pressing the battery unit.

The pressing member may press the battery unit in the first direction, and the support member may press the battery unit in a second direction perpendicular to the first direction.

Advantageous Effects of Disclosure

According to an embodiment of the present disclosure having the above-described structure, a battery pack, which has a reduced number of embedded components so as to have reduced cost and weight and has an efficiently adjusted internal temperature so as to have improved performance and stability, may be implemented. The scope of the present disclosure is not limited by these effects.

Furthermore, the effects of the present disclosure may be derived from the contents described below with reference to the drawings, in addition to the above-described contents.

MODE OF DISCLOSURE

Figure 1:
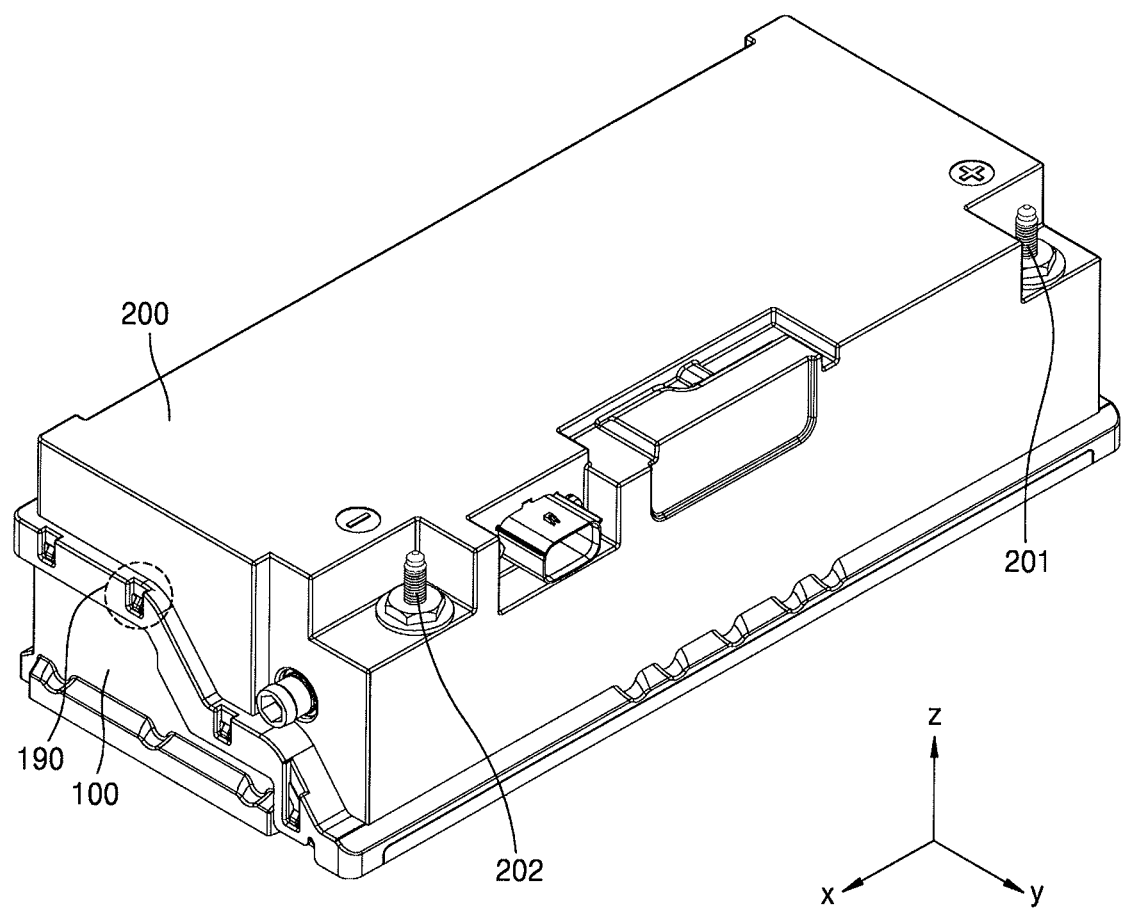
FIG. 1 is a perspective view schematically illustrating a battery pack according to an embodiment.

As the present disclosure allows for various changes and numerous embodiments, particular embodiments will be illustrated in the drawings and described in detail in the written description. The effects and features of the present disclosure, and ways to achieve them will become apparent by referring to embodiments that will be described later in detail with reference to the drawings. However, the present disclosure is not limited to the following embodiments but may be embodied in various forms.

Hereinafter, embodiments of the present disclosure will be described below in more detail with reference to the accompanying drawings. Those components that are the same or are in correspondence are rendered the same reference numeral regardless of the figure number, and a redundant description therewith is omitted.

It will be understood that although the terms "first," "second," etc. may be used herein to describe various components, these components should not be limited by these terms.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on," another layer, region, or component, it may be directly or indirectly formed on the other layer, region, or component. That is, for example, intervening layers, regions, or components may be present.

In the following embodiments, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Sizes of elements in the drawings may be exaggerated for convenience of explanation. In other words, since sizes and thicknesses of components in the drawings are arbitrarily illustrated for convenience of explanation, the following embodiments are not limited thereto.

Figure 2:
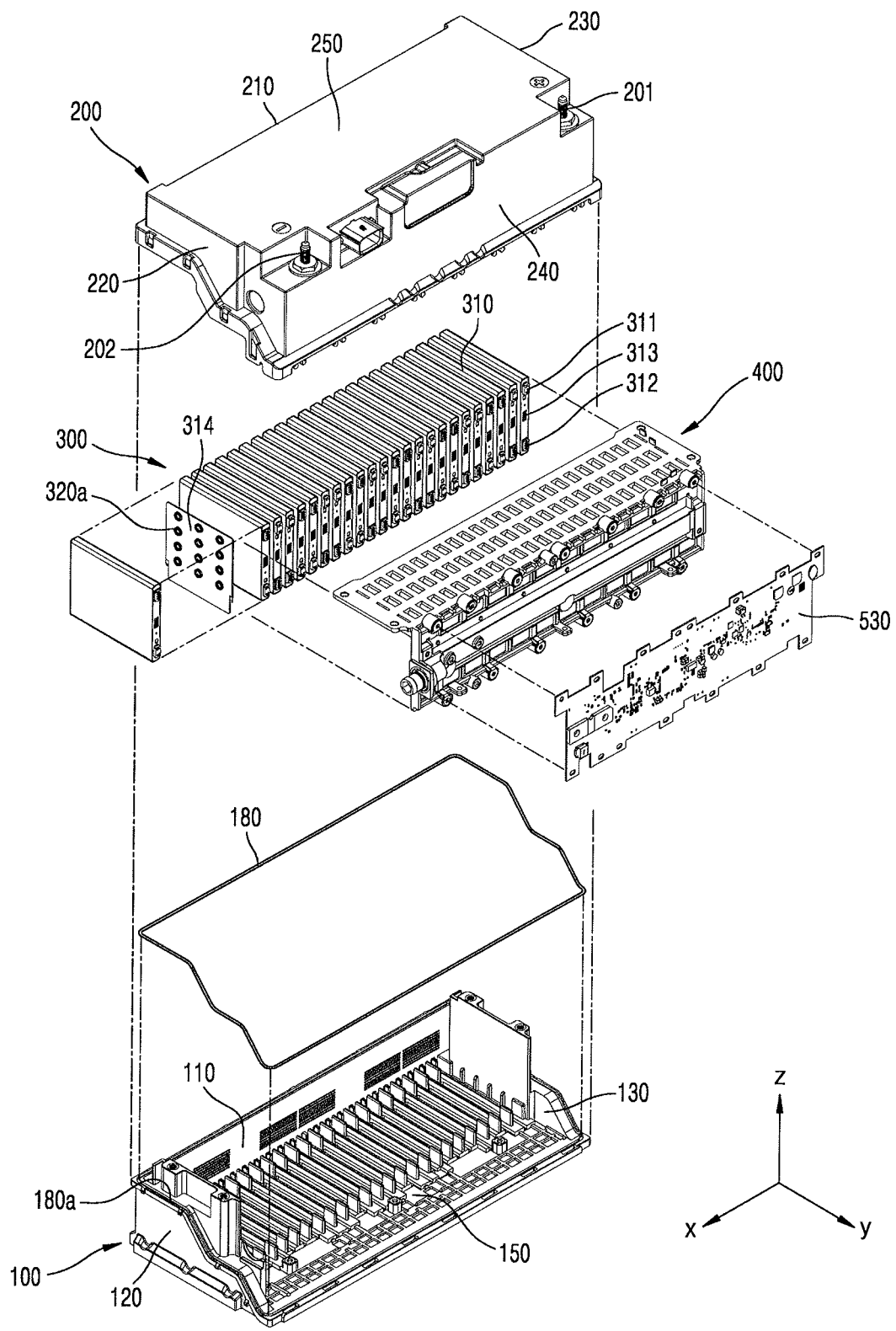
FIG. 2 is an enlarged perspective view schematically illustrating the battery pack of FIG. 1.

FIG. 1 is a perspective view schematically illustrating a battery pack according to an embodiment, and FIG. 2 is an enlarged perspective view schematically illustrating the battery pack of FIG. 1.

Referring to FIGS. 1 and 2, the battery pack according to an embodiment of the present disclosure may include a lower case 100 including a first lower side wall 110 extending from a bottom surface 150, a second lower side wall 120 and a third lower side wall 130, an upper case 200 arranged to face the lower case 100, and a battery unit 300 accommodated in the lower case 100, sealed by the upper case 200 and including a plurality of battery cells 310.

The lower case 100 and the upper case 200 may have an approximately hexahedral shape so as to accommodate the battery unit 300 and may be arranged to face each other. The lower case 100 and the upper case 200 may be coupled to each other via a fastening member 190.

A sealing member 180 may be further between the upper case 200 and the lower case 100. The sealing member 180 having a closed loop shape may be inserted into a groove 180a formed at a top end of the lower case 100. The sealing member 180 may seal between the lower case 100 and the upper case 200.

The lower case 100 may include the bottom surface 150, the first lower side wall 110 connected to the bottom surface 150, the second lower side wall 120, and the third lower side wall 130. The bottom surface 150 having a rectangular shape may include long sides and short sides. The first lower side wall 110 may extend from one long side of the bottom surface 150 in a +z-direction, and the second lower side wall 120 and the third lower side wall 130 respectively may extend in the +z-direction from one short side and the other short side of the bottom surface 150. The second lower side wall 120 and the third lower side wall 130 may be arranged to face each other. Referring to FIG. 2, the bottom surface 150 may be arranged in parallel with an x-y plane. The lower side wall 110 may be arranged in parallel with an x-z plane, and the second and third lower side walls 120 and 130 may be arranged in parallel with a z-y plane.

Meanwhile, in the present embodiment, one side of the lower case 100 may have an open shape. The lower case 100 has a structure in which three surfaces of the lower case 100 are surrounded by the first lower side wall 110, the second lower side wall 120 and the third lower side wall 130, and at least part of a side of the lower case 100 facing the first lower side wall 110 may have an open shape. The battery unit 300 may be easily mounted on the lower case 100 through one open side of the lower case 100. The side of the lower case 100 of FIG. 2 facing the first lower side wall 110 is entirely open. However, in another embodiment, a side wall having a smaller height than that of the first lower side wall 110 may also be provided at the side of the lower case 100 of FIG. 2 facing the first lower side wall 110. However, even in this case, the height of the side wall may be a height at which the battery unit 300 may be easily mounted on the lower case 100.

The upper case 200 may be arranged to face the lower case 100 with the battery unit 300 therebetween. As shown in FIG. 1, a shape in which the lower case 100 and the upper case 200 are coupled to each other, may have an overall hexahedral shape.

The upper case 200 may include a top surface 250, a first upper side wall 210, a second upper side wall 220, a third upper side wall 230, and a fourth upper side wall 240, which extend from the top surface 250 in a −z-direction. The top surface 250 may be in parallel with the bottom surface 150 of the lower case 100 and may have an overall the same shape as the bottom surface 150 of the lower case 100. Like in the bottom surface 150, the top surface 250 having a rectangular shape may include long sides and short sides. The second upper side wall 220 may extend from one short side of the top surface 250 in the −z-direction, and the third upper side wall 230 may extend from the other short side of the top surface 250 in the −z-direction. The second upper side wall 220 and the third upper side wall 230 may be arranged to face each other.

Meanwhile, the first upper side wall 210 may extend from one long side of the top surface 250, and the fourth upper side wall 240 may extend from the other long side of the top surface 250. In the present embodiment, at least part of the first upper side wall 210 and the fourth upper side wall 240 may be arranged to face each other. In this case, the first upper side wall 210 and the fourth upper side wall 240 may face each other but may not entirely correspond to each other. That is, the length corresponding to a z-axis of the fourth upper side wall 240 may be greater than the length corresponding to the z-axis of the first upper side wall 210.

First and second external terminals 201 and 202 may be located on the upper case 200. The first and second external terminals 201 and 202 may be electrically connected to the battery unit 300 embedded in the cases 100 and 200. A plurality of bus bars 320 may be electrically connected to the first and second external terminals 201 and 202. The first and second external terminals 201 and 202 may be connected to electrodes of the plurality of battery cells 310 connected to a lead plate (not shown) through the plurality of bus bars 320. For example, in the present embodiment, the first external terminal 201 may have a positive polarity, and the second external terminal 202 may have a negative polarity. In this case, the first external terminal 201 may be electrically connected to a first lead plate (not shown), and the second external terminal 202b may be electrically connected to a second lead plate (not shown). In this way, the first and second external terminals 201 and 202 may be electrically connected to the first and second lead plates (not shown) connected to the electrodes of one end and the other end of the plurality of battery cells 310. The battery unit 300 may be between the lower case 100 and the upper case 200 and may be accommodated in the lower case 100 and the upper case 200. The battery unit 300 may include the plurality of battery cells 310 that extend in a first direction (x-axis direction) and are aligned. Each of the plurality of battery cells 310 may include a first electrode terminal 311 and a second electrode terminal 312 and may include a vent hole 313 through which an internal gas may be discharged in a specific situation. A barrier 314 may be between the plurality of battery cells 310. A spacer 320a may be provided at the barrier 314, may be configured to separate the plurality of adjacent battery cells 310 and to form a space between the battery cells 310, thereby providing a movement passage of a refrigerant for cooling each of the plurality of battery cells 310.

Meanwhile, each of the battery cells 310 may connect between terminals of the other adjacent battery cell 310. The plurality of battery cells 310 may be arranged in a line along the first direction (x-direction). Thus, the battery unit 300 may be arranged in a hexahedral shape. In the present embodiment, terminals of the plurality of battery cells 310 may be aligned in parallel with the x-z plane. The present disclosure is not limited thereto, and the terminals of the plurality of battery cells 310 may also be in parallel with other planes according to positions or a connecting method of the terminals.

The holder unit 400 may be between the battery unit 300 and the upper case 200. The holder unit 400 will now be described in detail with reference to FIGS. 9 and 10.

Figure 3:
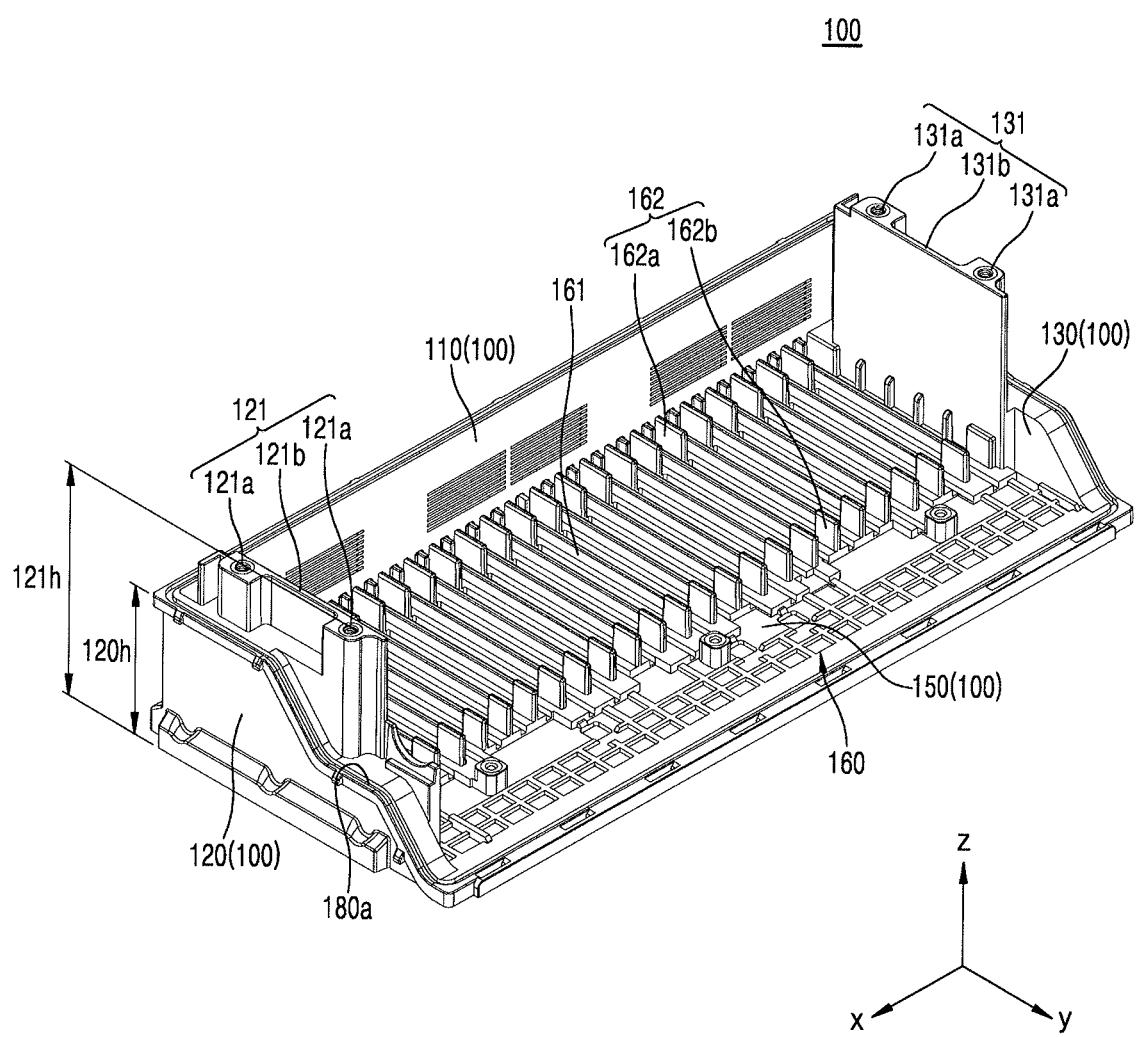
FIG. 3 is a perspective view schematically illustrating a lower case of the battery pack of FIG. 1.
Figure 4:
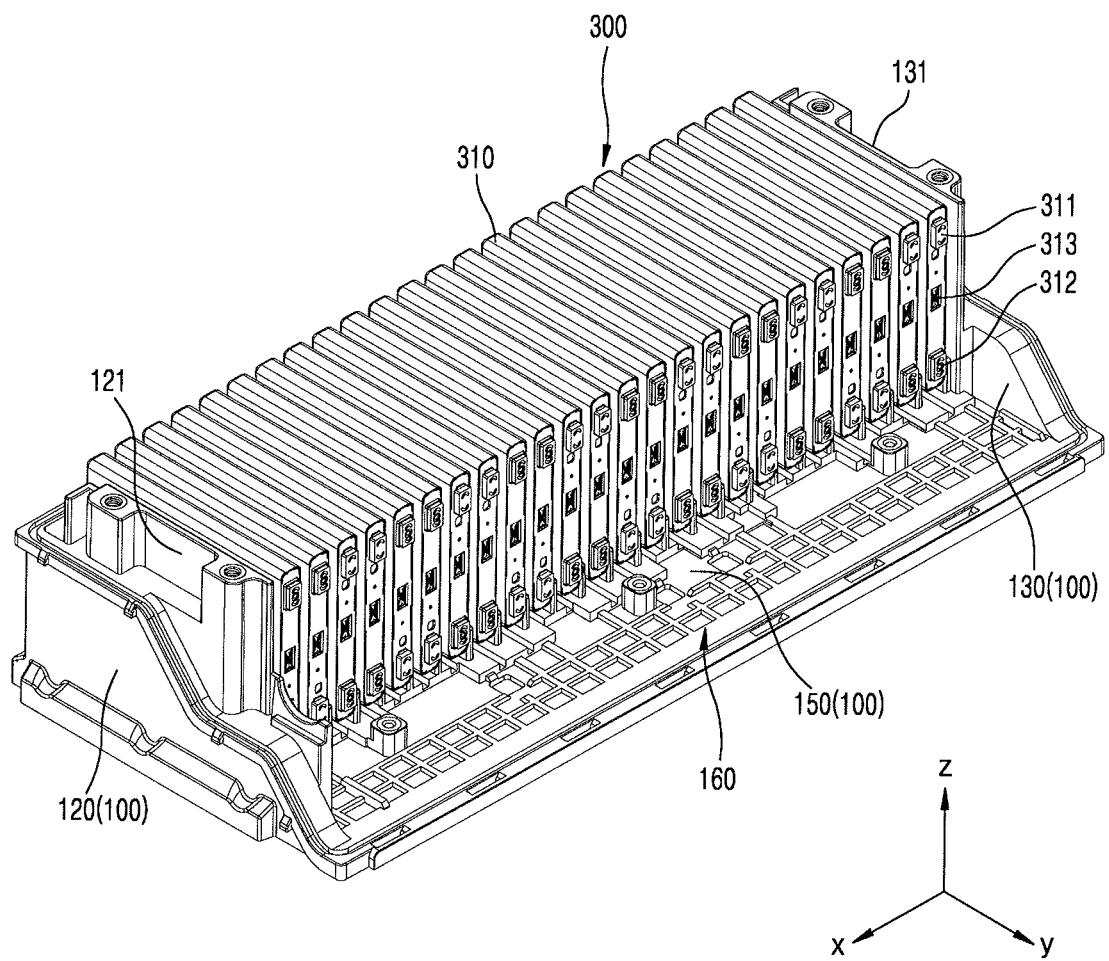
FIG. 4 is a perspective view schematically illustrating the case where a battery unit is mounted on the lower case of the battery pack of FIG. 1.

FIG. 3 is a perspective view schematically illustrating the lower case 100 of the battery pack of FIG. 1, and FIG. 4 is a perspective view schematically illustrating the case where the battery unit 300 is mounted on the lower case 100 of the battery pack of FIG. 1.

Referring to FIG. 3, the lower case 100 may include the bottom surface 150, the first lower side wall 110 extending from the bottom surface 150, the second lower side wall 120, and the third lower side wall 130. In the present embodiment, the bottom surface 150 of the lower case 100 may have a rectangular shape. However, the present disclosure is not limited thereto.

In the present embodiment, the first lower side wall 110 may have a rectangular shape extending from a long side of the bottom surface 150. The second lower side wall 120 and the third lower side wall 130 may be arranged to face each other and may have the same shape. In the present embodiment, the second lower side wall 120 may extend from one short side of the bottom surface 150 and may be connected to one end of the first lower side wall 110. Likewise, the third lower side wall 130 may extend from the other short side of the bottom surface 150 and may be connected to the other end of the first lower side wall 110.

Each of the second lower side wall 120 and the third lower side wall 130 may be connected to the first lower side wall 110 and arranged to face each other. For example, in the present embodiment, the bottom surface 150 may have a rectangular shape and may include long sides and short sides. The first through third lower side walls 110 through 130 may have the same shape as the side wall and may be connected to the bottom surface 150. The first lower side wall 110 that is a main side wall may extend from long sides of the bottom surface 150, and the second lower side wall 120 and the third lower side wall 130 that are sub-side walls may extend from short sides of the bottom surface 150.

Meanwhile, as described above, the second lower side wall 120 and the third lower side wall 130 may be provided to face each other. In the present embodiment, at least part of a side facing the first lower side wall 110 may be open. Thus, the plurality of battery cells 310 may be easily embedded in the lower case 100. A side of the lower case 100 of FIG. 3 facing the first lower side wall 110 is entirely open. However, in another embodiment, a side wall having a smaller height than the first lower side wall 110 may also be provided at the side of the lower case 100 of FIG. 3 facing the first lower side wall 110. However, even in this case, the height of the side wall may be a height at which the battery unit 300 may be easily mounted on the lower case 100.

Meanwhile, inner walls 121 and 131 may be arranged at the second lower side wall 120 and the third lower side wall 130 of the lower case 100, respectively. The inner wall 121 may be located inside the second lower side wall 120 and may be integrally formed with the second lower side wall 120. Also, the inner wall 131 may be located inside the third lower side wall 130 and may be integrally formed with the third lower side wall 130. The inner walls 121 and 131 may be arranged to face each other.

The inner walls 121 and 131 may have a first height 121$h$ based on the first bottom surface 150, and the second and third lower side walls 120 and 130 may have a second height 120$h$ based on the first bottom surface 150. In the present embodiment, the first height 121$h$ of the inner walls 121 and 131 may be greater than the second height 120$h$ of the second and third lower side walls 120 and 130. Thus, the inner walls 121 and 131 may function to support the upper case 200 from the inside when the upper case 200 is coupled to the lower case 100.

The inner walls 121 and 131 each may include protrusions 121$a$ and 131$a$ and insertion parts 121$b$ and 131$b$. Referring to FIG. 3, the protrusion 121$a$ of the inner wall 121 may protrude in an +x-direction, and the protrusion 131$a$ of the inner wall 131 may protrude in an −x-direction. Although not shown, in the upper case 200, inner sides of the second upper side wall 220 and the third upper side wall 230 each corresponding to the second lower side wall 120 and the third lower side wall 130 of the lower case 100 may be formed to engage with the protrusions 121$a$ and 131$b$ and the insertion parts 121$b$ and 131$b$ of the inner walls 121 and 131 described above, so that the upper case 200 may be coupled to the lower case 100 as if it is fitted in the lower case 100, and stronger support may be provided.

A plurality of first ribs 161 may be arranged on the bottom surface 150 inside the lower case 100. As shown in FIG. 3, each of the plurality of first ribs 161 may extend in a +y-direction. That is, each of the plurality of first ribs 161 may be in parallel with the short sides of the bottom surface 150. In other words, each of the plurality of first ribs 161 may extend in a direction in parallel with the second lower side wall 120 or the third lower side wall 130. The plurality of first ribs 161 may be arranged in a line along the first direction (x-axis direction).

Meanwhile, a plurality of second ribs 162 may be arranged between the plurality of first ribs 161. Each of the plurality of second ribs 162 may be arranged at one side and the other side of the plurality of first ribs 161 and may be not arranged in the center of the plurality of first ribs 161. Referring to FIG. 3, the plurality of second ribs 162 may include a plurality of (2-1)-th ribs 162$a$ located at one side of the plurality of first ribs 161 and a plurality of (2-2)-th ribs 162$b$ located at the other side of the plurality of first ribs 161. Each of the plurality of (2-1)-th ribs 162$a$ and the plurality of (2-2)-th ribs 162$b$ may form the second ribs 162 by pairing each other.

FIG. 4 illustrates a structure in which the battery unit 300 is mounted on the lower case 100. Referring to FIGS. 3 and 4, the plurality of first ribs 161 and the plurality of second ribs 162 may be of a slot type on which each of the plurality of battery cells 310 may be seated. That is, as shown in FIG. 3, each of the plurality of battery cells 310 may be seated on the bottom surface 150 of the lower case 100.

Figure 5:
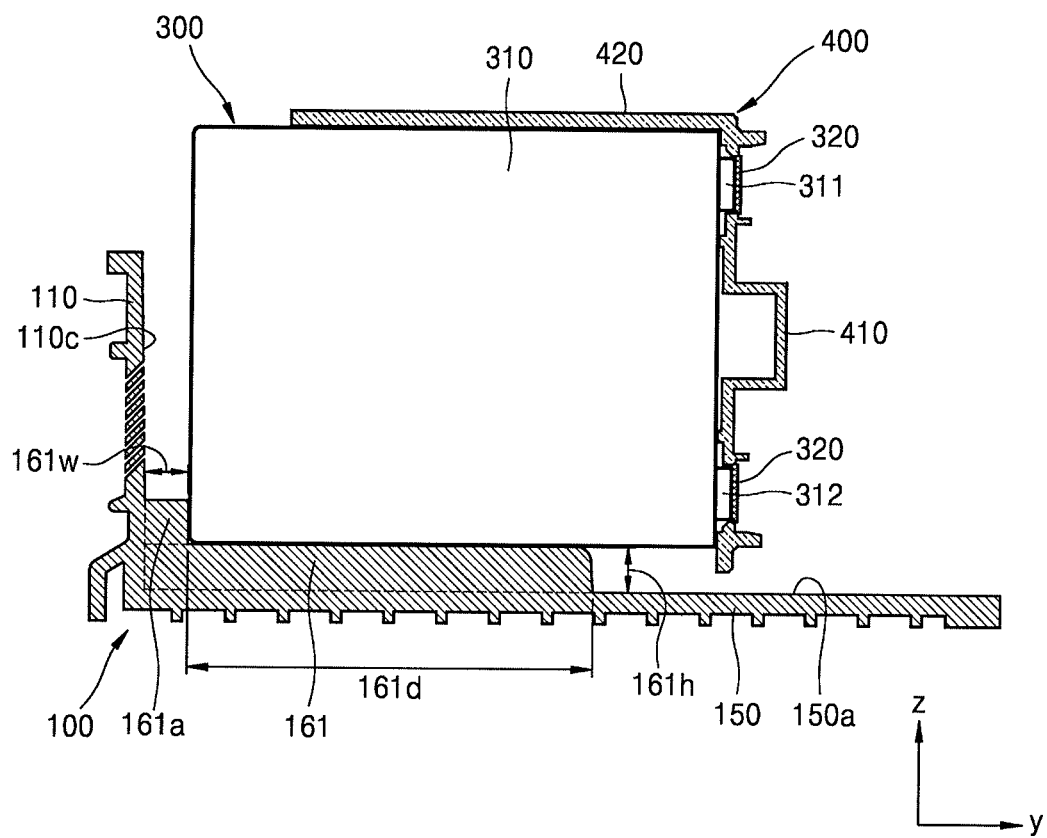
FIG. 5 is a cross-sectional view schematically illustrating the case where the battery unit is mounted on the lower case of the battery pack of FIG. 1.

Meanwhile, referring to FIG. 5, the plurality of first ribs 161 may be formed with the first height 161$h$, and the plurality of second ribs 162 may be formed with the second height 162$h$. This will be described in detail with reference to FIG. 5.

In the present embodiment, as shown in FIG. 3, the height of the plurality of second ribs 162 may be greater than the height of the plurality of first ribs 161. Each of the plurality of battery cells 310 may be located on the plurality of first ribs 161, as shown in FIG. 4. That is, the plurality of first ribs 161 may form a step from the bottom surface 150 of the lower case 100, such that the plurality of battery cells 310 seated on the plurality of first ribs 161 may be apart from the bottom surface 150 of the lower case 100. Because the plurality of second ribs 162 are arranged between the plurality of first ribs 161 and are formed with a greater height than the plurality of first ribs 162, the plurality of second ribs 162 may be located between the plurality of battery cells 310, may function to support the plurality of battery cells 310 and to maintain a distance between the battery cells 310.

Meanwhile, as described above, one side of the lower case 100 may have an open shape. That is, an opposite side of the first lower side wall 110 of the lower case 100 may have an open shape. A terrace part 160 may be provided on the bottom surface 150 of the open side of the lower case 100. A variety of members including a circuit board for electrical connection of the battery unit 300 may be located on the terrace part 160.

Thus, the plurality of first ribs 161 may not extend to the terrace part 160. That is, the plurality of first ribs 161 may extend from a side of the first lower side wall 110 up to the terrace part 160. The length of the plurality of first ribs 161 may be changed according to the sizes of the battery cells 310. However, in the present embodiment of FIG. 3, the length of the plurality of first ribs 161 may be about ⅔ of the width of the bottom surface 150 in the y-axis direction. Thus, the terrace part 160 may be formed with about ⅓ of the width of the bottom surface 150 in the y-axis direction.

Meanwhile, as shown in FIG. 3, the width of the inner walls 121 and 131 in the y-axis direction inside the second lower side wall 120 and the third lower side wall 130 may be the same as the length of the plurality of first ribs 161 in the y-axis direction. That is, the length of the plurality of first ribs 161 may be formed to correspond to the sizes of the plurality of battery cells 310. Thus, the sizes of the inner walls 121 and 131 may also be formed to correspond to the sizes of the plurality of battery cells 310. That is, as shown in FIG. 4, the width of the inner walls 121 and 131 in the y-axis direction may be the same as the width of the plurality of battery cells 310, and the height of the inner walls 121 and 131 in the z-axis direction may be the same as the height of the plurality of battery cells 310. The inner walls 121 and 131 may protect the plurality of battery cells 310 arranged on the outermost side so as to protect the battery unit 300.

Figure 6:
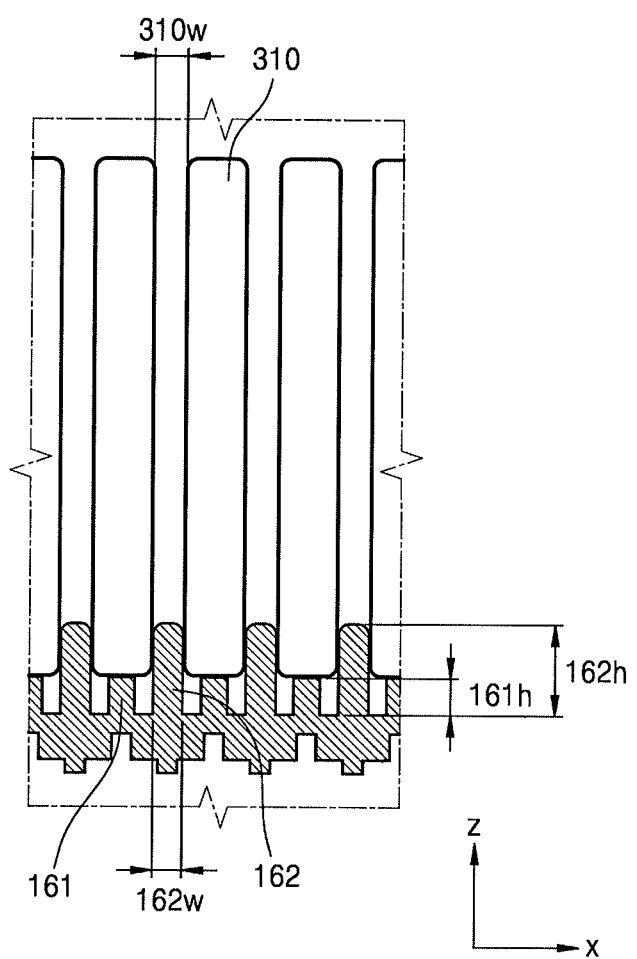
FIG. 6 is a front view schematically illustrating the case where the battery unit is mounted on the lower case of the battery pack of FIG. 1.

FIG. 5 is a cross-sectional view schematically illustrating the case where the battery unit 300 is mounted on the lower case 100 of the battery pack of FIG. 1, and FIG. 6 is a front view schematically illustrating the case where the battery unit 300 is mounted on the lower case 100 of the battery pack of FIG. 1.

FIGS. 5 and 6 illustrate the plurality of battery cells 310 mounted on the lower case 100.

Referring to FIG. 5, the battery cell 310 is mounted on the first rib 161. The battery cell 310 may be seated on the first rib 161. The first ribs 161 may be provided to have the first height 161$h$ based on a top side 150$a$ of the bottom surface 150 of the lower case 100. The battery cells 310 may be seated on the first rib 161 and may be apart from the bottom surface 150 of the lower case 100 by the first height 161$h$.

The first rib 161 may include a jaw portion 161$a$ located on one side of the first rib 161. The jaw portion 161$a$ may be connected to the first lower side wall 110 of the lower case 100, and a lower end of one side of the battery cell 310 may be adjacent to the jaw portion 161$a$. Thus, the battery cells 310 may be apart from an inner side surface 110$c$ of the first lower side wall 110 of the lower case 100 by a certain distance 161$w$ corresponding to a degree of protrusion of the jaw portion 161$a$.

Meanwhile, the first rib 161 excluding the jaw portion 161$a$ may be formed with a first length 161$d$. In the present embodiment, because the battery cells 310 may be arranged in such a way that the first electrode terminal 311 and the second electrode terminal 312 may face an open side of the lower case 100, the length of the battery cells 310 in the y-axis direction may be greater than the first length 161$d$ of the first ribs 161. That is, one side of the battery cell 310 may be arranged to be in contact with the jaw portion 161$a$, and the other side at which the first electrode terminal 311 and the second electrode terminal 312 of the battery cell 310 are located, may protrude more than the first rib 161. Thus, the other sides of the battery cells 310 may be apart from the bottom surface 150 by a certain distance corresponding to the first height 161$h$.

Meanwhile, the first ribs 161 may be located on the inner side surface of the bottom surface 150 of the lower case 100, as described above. Referring to FIG. 6, each of the plurality of battery cells 310 may be located between the plurality of first ribs 161 and the plurality of second ribs 162. Each of the plurality of battery cells 310 may be seated on the plurality of first ribs 161 and may be supported by the plurality of second ribs 162 arranged at both sides of the plurality of first ribs 161. The plurality of battery cells 310 may be of a slot type in which they are directly assembled on the bottom surface 150 of the lower case 100. The plurality of battery cells 310 may be inserted between the plurality of second ribs 162 through forced fit, for example.

The plurality of second ribs 162 may be provided to have the second height 162$h$, and the plurality of first ribs 161 may be provided to have the first height 161$h$. In the present embodiment, the second height 162$h$ of the plurality of second ribs 162 may be greater than the first height 161$h$ of the plurality of first ribs 161. The plurality of first ribs 161 are portions where the plurality of battery cells 310 are directly seated on the plurality of first ribs 161, and each of the plurality of battery cells 310 mounted on the plurality of first ribs 161 may be apart from the bottom surface 150 of the lower case 100 by the first height 161$h$. Also, each of the plurality of second ribs 162 may be arranged between the plurality of first ribs 161, such that the plurality of battery cells 310 may be inserted between the plurality of second ribs 162.

Each of the plurality of battery cells 310 may be apart from each other by a certain distance 310$w$. The certain distance 310$w$ between the plurality of battery cells 310 may be the same as a width 162$w$ of the plurality of second ribs 162 in the x-direction. In this way, as the plurality of battery cells 310 are apart from each other by the certain distance 310$w$, swelling of the plurality of battery cells 310 may be prevented, and thermal propagation between the plurality of battery cells 310 may be prevented.

Figure 7:
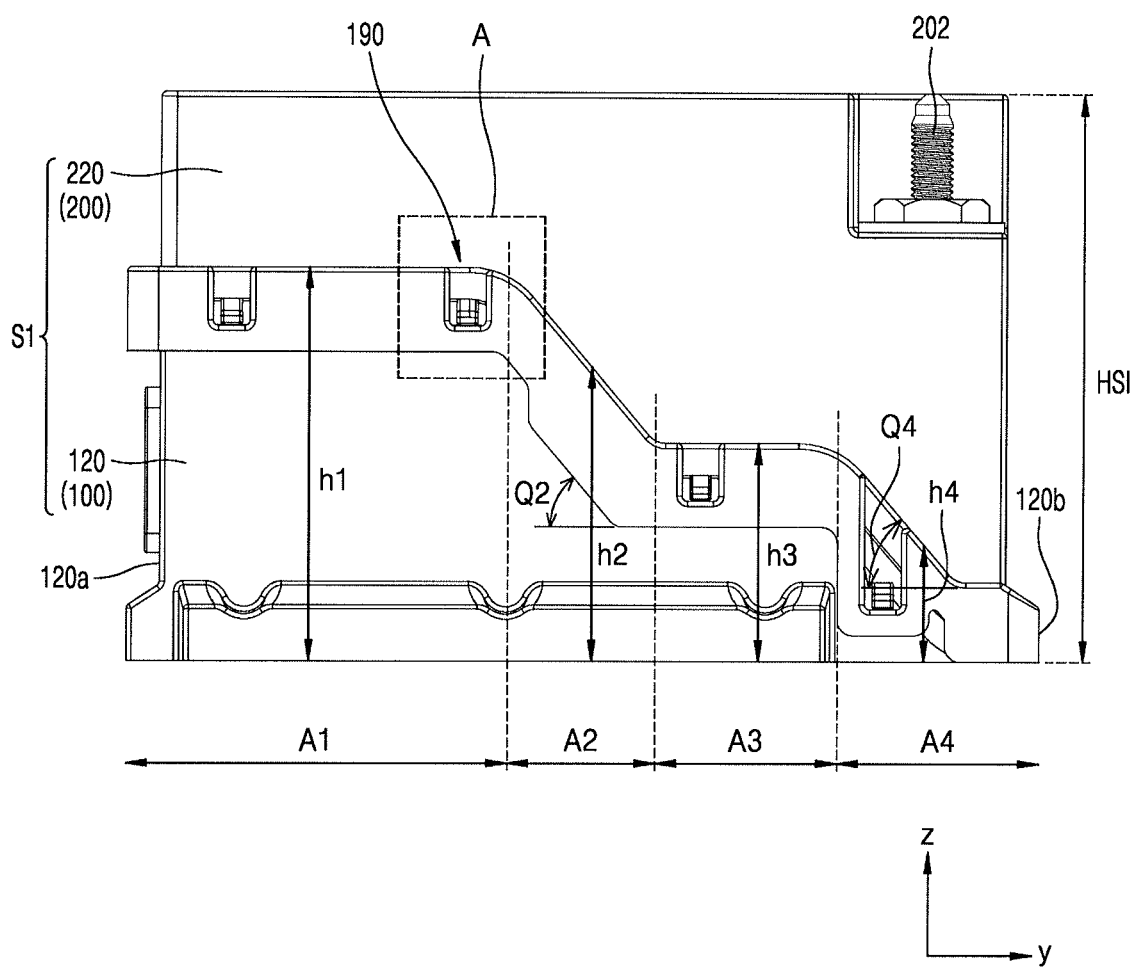
FIG. 7 is a side view schematically illustrating side walls of the battery pack of FIG. 1.
Figure 8:
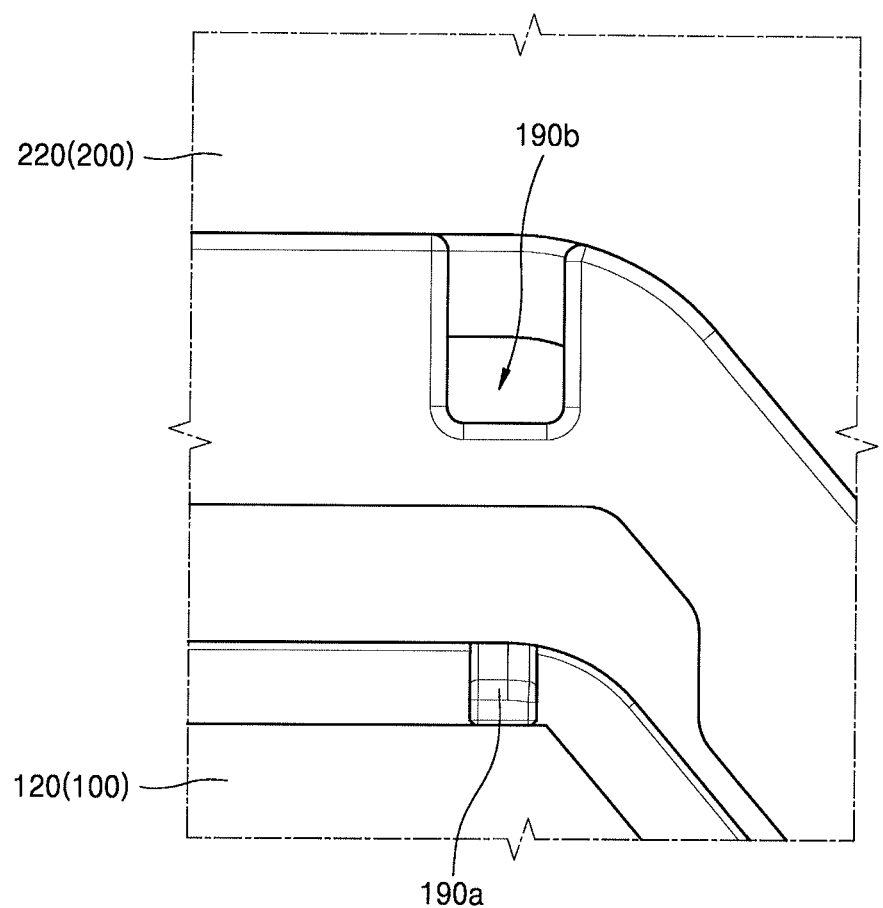

FIG. 7 is a side view schematically illustrating side walls of the battery pack of FIG. 1, and FIG. 8 is an enlarged view of region A of FIG. 7. The battery pack of FIG. 7 illustrates a shape in which the lower case 100 and the upper case 200 are coupled to each other.

Referring to FIG. 7, the lower case 100 and the upper case 200 in the battery pack according to the present embodiment may be coupled to each other so as to be engaged with each other. Ends of the lower case 100 and the upper case 200 may be formed in a stepped shape (not a straight line shape), and the stepped shape of the upper case 200 may be formed so as to be engaged with the stepped shape of the lower case 100.

In detail, ends of the second lower side wall 120 and the third lower side wall 130 of the lower case 100 may be formed in a stepped shape so as to be engaged with ends of the second upper side wall 220 and the third upper side wall 230 of the upper case 200. FIG. 7 illustrates the second lower side wall 120 of the lower case 100 and the second upper side wall 220 of the upper case 200. The third lower side wall 130 of the lower case 100 and the third upper side wall 230 of the upper case 200 are not separately illustrated but may have the same shape based on the shape of FIG. 7.

The height of the second lower side wall 120 of the lower case 100 may decrease from one side 120a of the second lower side wall 120 to the other side 120b of the second lower side wall 120. In this case, one side 120a of the second lower side wall 120 may be understood as a portion connected to the first lower side wall 110. The height of the second lower side wall 120 may gradually decrease from one side 120a connected to the first lower side wall 110 to the other side 120b.

The second lower side wall 120 of the lower case 100 may include first through fourth areas A1 through A4 divided according to areas. In this case, the first through fourth areas A1 through A4 may be defined as areas by dividing the second lower side wall 120 according to heights.

The lower case 100 may be divided into the first area A1, the second area A2, the third area A3, and the fourth area A4 in order from one side 120a. That is, the first area A1 that is adjacent to the first lower side wall 110 may be formed to have a first height h1. The second area A2 that is adjacent to the first area A1 may be formed to have a second height h2. The third area A3 that is adjacent to the second area A2 may be formed to have a third height 113. The fourth area A4 that is adjacent to the third area A3 may be formed to have a fourth height h4.

In the present embodiment, the first area A1 and the third area A3 may be formed with a certain height. The first area A1 that extends from the first lower side wall 110, as described above, may be formed with the same height as the first lower side wall 110. The first height h1 of the first area A1 may be greater than the third height h3 of the third area A3. That is, as shown in FIG. 7, the third height h3 of the third area A3 may be smaller than the first height h1 of the first area A1.

The second area A2 may have the second height h2 that gradually decrease from one side to the other side. An end of the second area A2 between the first area A1 and the third area A3 may be inclined. That is, the height of one side of the second area A2 may start at the same height as the first height h1 of the first area A1 but may gradually decrease toward the other side, and the other side of the second area A2 may be formed with the same height as the third height 113 of the third area A3.

The third area A3 may have a certain height, like in the first area A1, as described above, and the third height h3 of the third area A3 may be smaller than the first height h1 of the first area A1. The third area A3 may be in contact with the fourth area A4. The fourth area A4 may have a height gradually decreasing, like in the second area A2. That is, the fourth height h4 of the fourth area A4 may gradually decrease from one side to the other side of the fourth area A4 contacting the third area A3.

In an embodiment, the fourth height h4 of the fourth area A4 may decrease up to the bottom surface 150 at an end of the other side of the fourth area A4. It will be understood that this is because one side of the lower case 100 according to the present embodiment has an open shape, as described above. As described above, a top end of the second area A2 and the fourth area A4 on which the second area A2 and the fourth area A4 meet with the upper case 200, may have certain angles Q2 and Q4 from the ground. These angles Q2 and Q4 may be provided as about 35° to 55°, for example, and preferably, the angles Q2 and Q4 of 45°. The angles Q2 and Q4 of the top end of the second area A2 and the fourth area A4 of FIG. 7 are the same. However, the angles Q2 and Q4 of the top end of the second area A2 and the fourth area A4 may be different from each other.

Meanwhile, FIG. 7 illustrates one side surface of a configuration in which the lower case 100 and the upper case 200 are coupled to each other, in the battery pack of FIG. 1. The second external terminal 202b may be located on one side of the upper case 200.

Referring to FIGS. 7 and 8, the lower case 100 and the upper case 200 may be coupled to each other via the fastening member 190. FIG. 7 illustrates the battery pack having the lower case 100 and the upper case 200 coupled thereto by the fastening member 190, and FIG. 8 illustrates the battery pack having the lower case 100 and the upper case 200 separated therefrom by the fastening member 190.

That is, the battery pack according to the present embodiment may be coupled by the fastening member 190 located at an end on which the lower case 100 and the upper case 200 are in contact with each other. In the present embodiment, the fastening member 190 may be of a hook type. However, the present disclosure is not limited thereto. The fastening member 190 may function to provide a coupling force to the lower case 100 and the upper case 200, and the lower case 100 and the upper case 200 may be coupled to each other by other fastening structures according to the related art than the hook-type fastening member.

For example, the fastening member 190 may be formed of a combination of the first fastening member 190a and the second fastening member 190b. In the present embodiment, the first fastening member 190a may be located on the lower case 100, and the second fastening member 190b may be located on the upper case 200. The first fastening member 190a may have a protruding structure, and the second fastening member 190b may have a loop-shaped structure in which the first fastening member 190a may be inserted. The fastening member 190 may be inserted and coupled as the first protruding fastening member 190a is inserted into the second loop-shaped fastening member 190b.

In the present embodiment, a plurality of fastening members 190 may be provided, and at least one fastening member may be provided on a surface on which the lower case 100 and the upper case 200 are in contact with each other. FIG. 7 illustrates a side surface on which the second lower side wall 120 of the lower case 100 and the second upper side wall 220 of the upper case 200 meet with each other. Four fastening members 190 are provided on one side surface, however, the present disclosure is not limited thereto.

Meanwhile, referring to FIG. 7, the first lower side wall 110 and the first upper side wall 210 in the state where the lower case 100 and the upper case 200 are coupled to each other, form one surface S1 of the battery pack that constitutes a rectangular parallelepiped. A sum HS1 of the height of the first lower side wall 110 of the lower case 100 and the height of the first upper side wall 210 of the upper case 200 that constitute one surface S1 of the battery pack may be uniform. That is, the first lower side wall 110 and the first upper side wall 210 may be formed to be engaged with each other, as shown in FIG. 7. Thus, the sum HS1 of the height of the first lower side wall 110 and the height of the first upper side wall 210 may be the same.

Figure 9:
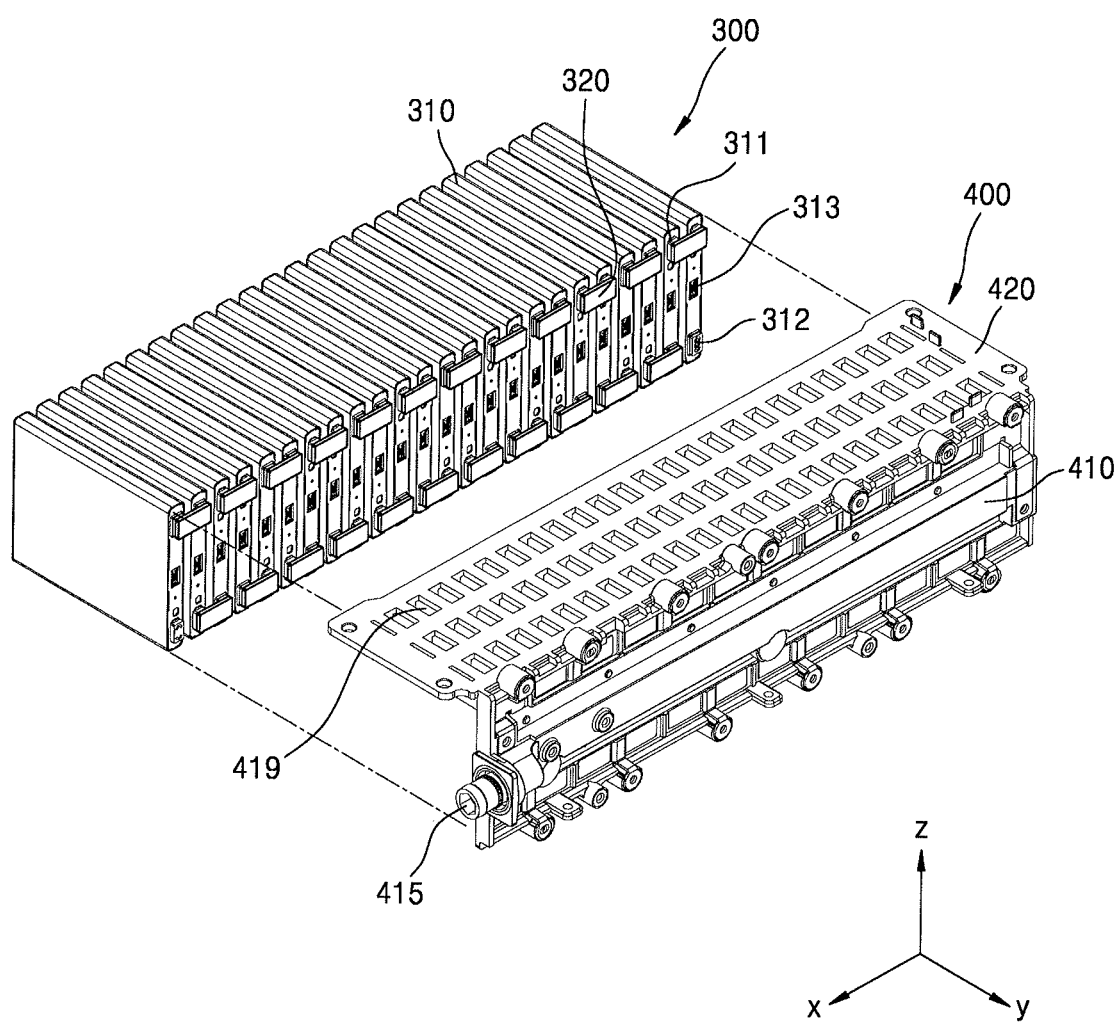
FIG. 9 is a perspective view schematically illustrating the battery unit to which a holder unit is coupled, in the battery pack of FIG. 1.
Figure 10:
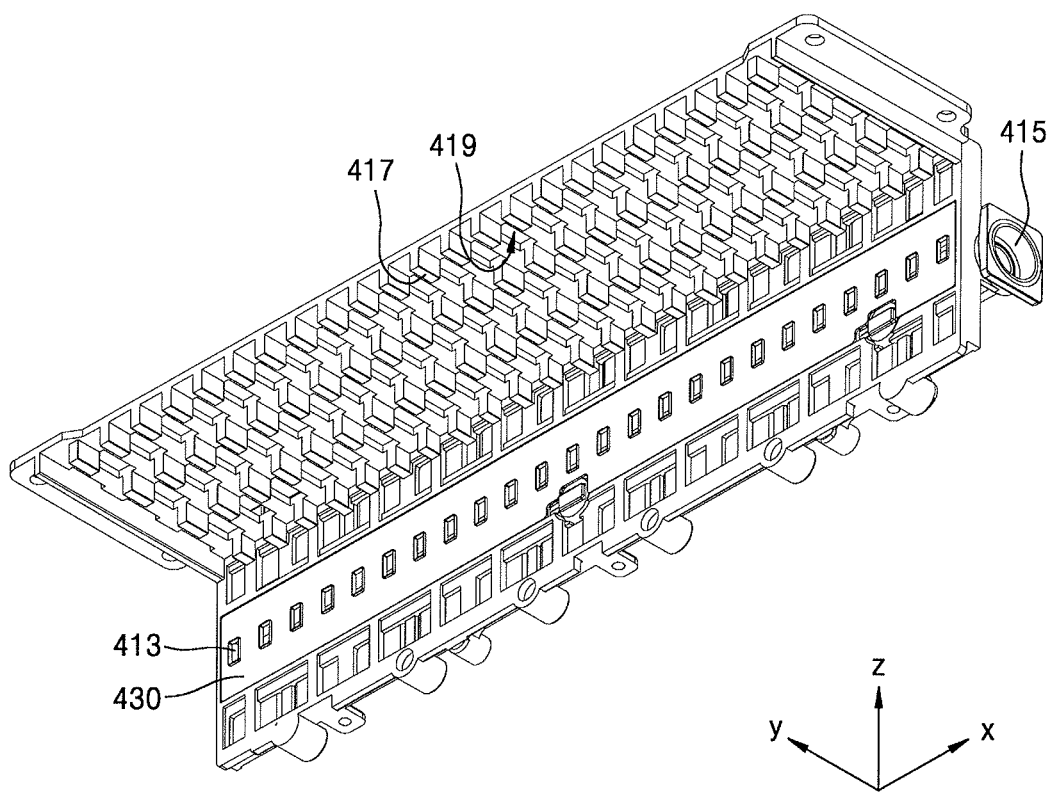
FIG. 10 is a perspective view schematically illustrating the holder unit of the battery pack of FIG. 1.

FIG. 9 is a perspective view schematically illustrating the battery unit 300 to which the holder unit 400 is coupled, in the battery pack of FIG. 1, and FIG. 10 is a perspective view schematically illustrating the holder unit 400 of the battery pack of FIG. 1.

FIG. 9 illustrates the battery unit 300 and the holder unit 400 excluding the lower case 100 and the upper case 200 described above, and FIG. 10 illustrates only the holder unit 400.

Referring to FIG. 9, the battery unit 300 including a plurality of battery cells 310 may be provided, and the battery unit 300 may have a hexahedral shape extending in an approximately x-axis direction. A plurality of bus bars 320 connecting the plurality of battery cells 30 may be provided on one surface of the battery unit 300. Each of the plurality of bus bars 320 may be arranged to be in contact with terminals of the plurality of battery cells 310. In the present embodiment, the terminals of the plurality of battery cells 310 may be located on the x-z plane, i.e., a surface perpendicular to the bottom surface 150.

The holder unit 400 may be located on the battery unit 300 so as to cover at least two surfaces of the battery unit 300. That is, the holder unit 400 may include a first holder member 410 and a second holder member 420, which are bent at a preset angle, and each of the first holder member 410 and the second holder member 420 may be located on the battery unit 300. In the present embodiment, the first holder member 410 may be located on the plurality of bus bars 320, and the second holder member 420 may support the plurality of battery cells 310 from above. That is, as shown in FIG. 9, the first holder member 410 may be located on the x-z plane, and the second holder member 420 may be located on the x-y plane. In the present embodiment, the holder unit 400 may further include the second holder member 420 extending perpendicular to the first holder member 410 in addition to the first holder member 410 covering the plurality of bus bars 320, so that the holder unit 400 may function to entirely support the battery unit 300 without providing an additional fixing member.

The holder unit 400 may be bent at a preset angle, as described above. The holder unit 400 according to the present embodiment may be bent at an angle of approximately 90°, i.e., the holder unit 400 may be formed in a '¬' shape.

The first holder member 410 of the holder unit 400 may be located on the plurality of bus bars 320. The plurality of bus bars 320 may be coupled to the terminals of the plurality of battery cells 310. Thus, the plurality of bus bars 320 may be arranged on both sides along the terminals of the plurality of battery cells 310. A vent hole 313 may be provided in the center of the terminals of the plurality of battery cells 310. Thus, based on the plurality of bus bars 320, it will be understood that the vent hole 313 is located in the center of the plurality of bus bars 320.

Meanwhile, referring to FIG. 10 together, an insulating gasket member 430 may be provided between the battery unit 300 and the first holder member 410 of the holder unit 400. The insulating gasket member 430 may be formed of a heat-resistant material and may be a gasket that may prevent gas leakage. As the battery unit 300 according to the present embodiment is charged and discharged, heat is generated therein. In this case, the plurality of battery cells 310 may dissipate high heat to the surroundings, and the insulating gasket member 430 mounted on the battery unit 300 may be melted by the heat. In this way, when the insulating gasket member 430 is melted, a sealing ability between the insulating gasket member 430 and the holder unit 400 may be reduced so that gas may leak.

In an embodiment, when the battery unit 300 and the holder unit 400 are formed of different materials, the battery unit 300 and the holder unit 400 may be not easily in contact with each other, and gas may leak at a portion where the contact is weak. In order to prevent this, the insulating gasket member 430 that is a gasket may be provided between the battery unit 300 and the holder unit 400, and airtightness between the battery unit 300 and the holder unit 400 may be easily maintained by the insulating gasket member 430.

The insulating gasket member 430 may be provided as a single body, because a plurality of vent holes 313 of the plurality of battery cells 310 may be sealed at once. In this case, a plurality of openings 413 corresponding to the plurality of vent holes 313 may be provided on the insulating gasket member 430. The size of each of the plurality of openings 413 may be equal to or greater than the size of each of the plurality of vent holes 313. When the size of each of the plurality of openings 413 is greater than the size of each of the plurality of vent holes 313, the insulating gasket member 430 is less likely to be melted because the insulating gasket member 430 does not come into direct contact with high-temperature gas discharged from the plurality of vent holes 313.

The holder unit 400 may include a gas outlet 415 at one side thereof and may be in close contact with the insulating gasket member 430, thereby forming a flow path of gas connected to the gas outlet 415. As the plurality of battery cells 310 are charged and discharged, gas may be generated as a by-product of electrode plates and an electrolyte, and the gas may be discharged through the vent holes 313. The gas may be discharged to the outside through the gas outlet 415 provided at the holder unit 400. In this case, the gas outlet 415 may have a cylindrical shape, because it does not affect an adjacent battery pack. However, the shape of the gas outlet 415 is not limited thereto.

Meanwhile, the holder unit 400 may further include a projection member 417 including a plurality of projections in the second holder member 420 so as to press and fix the battery unit 300. Referring to FIG. 10, the projection member 417 may be located at a bottom surface of the second holder member 420 so as to press and support the battery unit 300 in a −z-direction from above, and a plurality of projections may be arranged to form a matrix. The projection member 417 may improve a fixing force of the battery unit 30 directly mounted on the lower case 100 without being separately modulated by pressing and supporting the battery unit 300 in the −z-direction from above.

The holder unit 400 may further include a ventilation member 419 including a plurality of ventilation holes in the second holder member 420 so as to discharge heat dissipated from the battery unit 300 to the outside. Referring to FIG. 9, the ventilation member 419 may be formed to pass through the second holder member 420, and a plurality of ventilation holes may be arranged to form a matrix. Referring to FIG. 10, the ventilation member 419 may be formed between projection members 417. The flow of air in the battery pack may be smoothly performed through the ventilation member 419 so that a cooling effect of the battery unit 300 may be enhanced.

Figure 11:
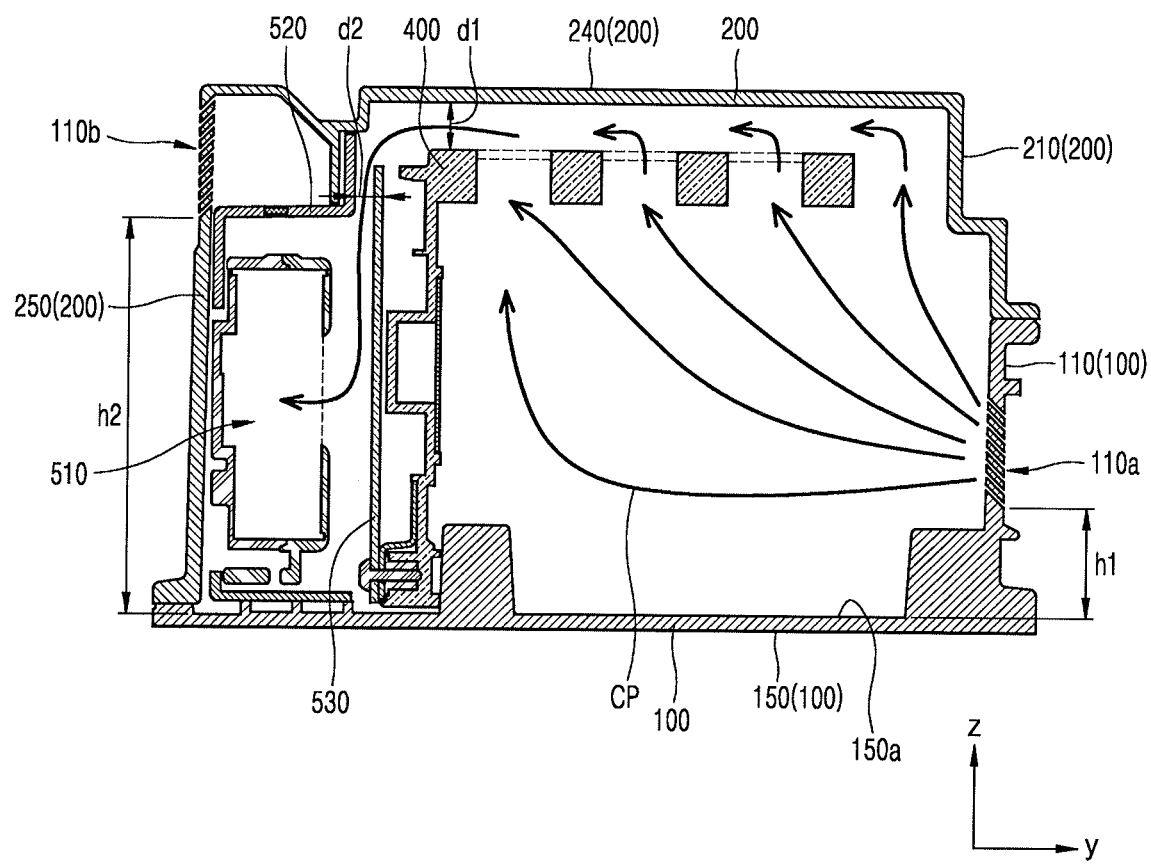
FIG. 11 is a cross-sectional view schematically illustrating the lower case and an upper case of the battery pack of FIG. 1.
Figure 12:
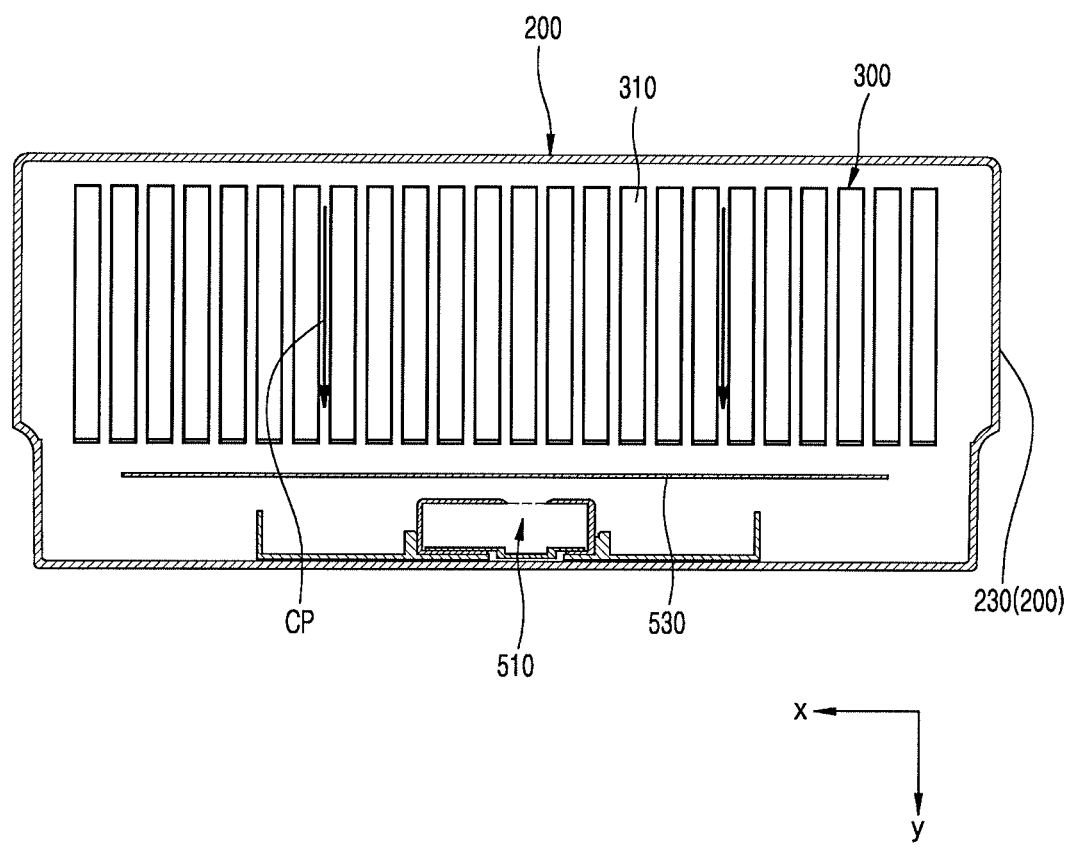
FIG. 12 is a cross-sectional view schematically illustrating the battery pack of FIG. 1.

FIG. 11 is a cross-sectional view schematically illustrating the lower case 100 and the upper case 200 of the battery pack of FIG. 1, and FIG. 12 is a cross-sectional view schematically illustrating the battery pack of FIG. 1.

As described above, when the battery pack is configured, proper temperature maintenance inside the battery pack is essentially required for the lifespan and stability of the plurality of battery cells 310. In particular, in the case of an air cooling type battery pack, the key is whether the path of the air cooling type battery pack can cool the front sides of the plurality of battery cells 310. Hereinafter, a battery pack according to the present embodiment that may easily solve the above-described problems is provided.

Referring to FIGS. 11 and 12, a first ventilation part 110*a* may be provided on the first lower side wall 110 of the lower case 100, and a second ventilation part 110*b* may be provided on the fourth upper side wall 240 of the upper case 200. The first ventilation part 110*a* may be formed through the first lower side wall 110 of the lower case 100, and the second ventilation part 110*b* may be formed through the fourth upper side wall 240 of the upper case 200.

In the present embodiment, the first ventilation part 110*a* may be located at a first height 110*h*1 based on the top surface 150*a* of the bottom surface 150, the second ventilation part 110*b* may be located at a second height 110*h*2 based on the top surface 150*a* of the bottom surface 150. In this case, the second height 110*h*2 at which the second ventilation part 110*b* is located, may be greater than the first height 110*h*1 at which the first ventilation part 110*a* is located.

In general, cold air is located at the bottom, and warm air is located at the top, causing convection. Thus, cold air is introduced into the battery pack through the first ventilation part 110*a* located in a relatively low position, and the cold air cools the battery unit 300 located inside the battery pack, and air passing through the battery unit 300 absorbs heat of the battery unit 300, and the absorbed heat is discharged to the outside through the second ventilation part 110*b* located in a relatively high position. The positions of the first ventilation part 110*a* and the second ventilation part 110*b* use a convection phenomenon of air, so that convention of air within the battery pack may be easily performed and thus the battery pack may be efficiently cooled.

A cooling path CP that is the flow of air described above is illustrated as an arrow of FIG. 11. As shown in FIG. 11, air introduced into the battery pack through the first ventilation part 110*a* may cool the side surface of the battery unit 300, may pass through the battery unit 300 and may pass through the ventilation member 419 of the holder unit 400 located on the battery unit 300. The cooling path CP passing through the ventilation member 419 of the holder unit 400 may pass through a separated space d1 between the holder unit 400 and the upper case 200 and may move in a direction in which a fan 510 is provided. The cooling path CP moving to the side at which the fan 510 is located, may pass through the separated space d2 between a first circuit board 520 and a second circuit board 530. For example, the first circuit board 520 may be a battery disconnect unit (BDU), and the second circuit board 530 may be a battery management system (BMS). The fan 510 may induce the cooling path CP toward the second ventilation part 110*b* due to a rotational force and may function to adjust the speed of the cooling path CP within the battery unit 300.

Figure 13:
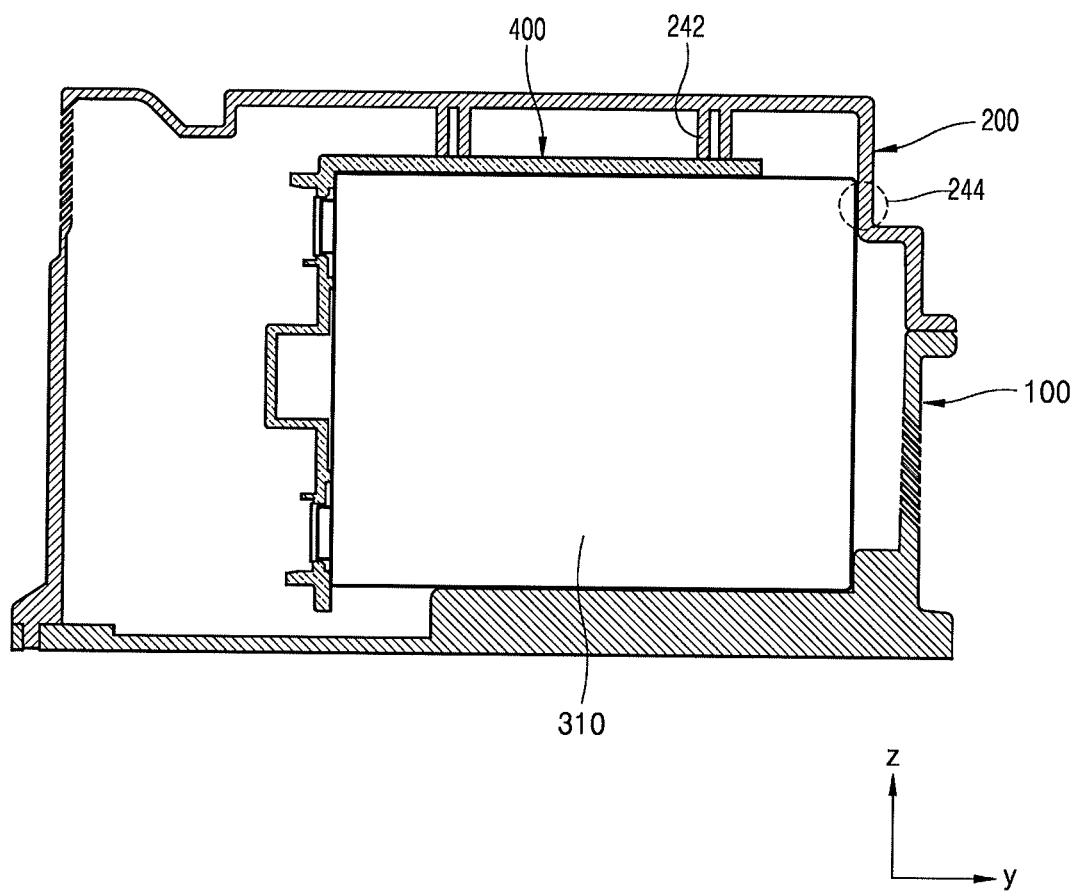
FIG. 13 is a cross-sectional view schematically illustrating the lower case on which the battery unit is mounted, and the upper case of the battery pack of FIG. 1.

FIG. 13 is a cross-sectional view schematically illustrating the lower case 100 and the upper case 200 on which the battery unit 300 is mounted, in the battery pack of FIG. 1.

As described above, a battery pack according to the related art forms a module in which the plurality of battery cells 310 are stacked, and the module is mounted in the battery pack. In such a module structure, an external case in which the battery unit 300 is embedded, is not affected by internal components but has only the function of protecting the internal components and the function of packaging the battery pack. However, in such a battery pack, the size of the battery pack is increased due to the module structure inside the battery pack, and too many components compared to the number of the plurality of battery cells 310 are required, causing an increase in the weight, process and cost of the entire battery pack and thus there was a problem that this method is not proper for a method of constructing an optimum battery pack.

Thus, in the battery pack according to the present embodiment, the module structure inside the battery pack causing an increase in the weight, process and cost caused by the number of components when the battery pack is implemented, is not applied, but a structure for pressing the battery unit 300 toward the upper case 200 and increasing a constraint force is applied so that a structure in which the plurality of battery cells 310 may be directly seated inside the battery pack without using a module structure, may be provided.

Referring to FIGS. 13 and 14, the battery pack according to the present embodiment may include a support member 242 provided on the top surface 250 of the upper case 200 so as to press the battery unit 300 in the z-axis direction. The support member 242 may be located at a lower part of the top surface 250 of the upper case 200 and may be formed to protrude toward the battery unit 300. In FIG. 14, the support member 242 is located in two rows. However, the position and the number of support members 242 may be modified in various embodiments.

Referring to FIG. 13, the holder unit 400 may be between the battery unit 300 and the support member 242. That is, the second holder member 420 of the holder unit 400 extending along a lengthwise direction (y-axis direction) of the plurality of battery cells 310 may be arranged to surround at least part of one side surface of the battery unit 300, and the support member 242 may be in direct contact with the holder unit 400 so as to entirely press the holder unit 400 and the battery unit 300.

Meanwhile, a fixing member 244 may be located at a portion connecting the first upper side wall 210 to the top surface 250 of the upper case 200. The fixing member 244 may be inserted into the battery unit 300 so as to press the battery unit 300 in the portion connecting the top surface 250 to the first upper side wall 210.

The support member 242 may press the battery unit 300 in the −z-direction from above, and the fixing member 244 may press the battery unit 300 in the −y-direction from the side. In this way, the battery unit 300 pressed simultaneously in the first direction and the second direction may be more stably seated within the lower case 100 through the fixing member 244 and the support member 242.

Although the present disclosure has been described with reference to the embodiments shown in the drawings, this is just an example, and it will be understood by those of ordinary skill in the art that various modifications and equivalent embodiments are possible. The scope of right technical protection of the present disclosure should be defined by the technical spirit of the attached claims.

The invention claimed is:

1. A battery pack, comprising:
    a lower case including:
        a first lower side wall extending from a bottom surface,
        a second lower side wall and a third lower side wall respectively connected with the first lower side wall and arranged so as to face each other, a height of each of the second lower side wall and the third lower side wall decreasing from a first side connected to the first lower side wall to a second side opposite the first side, and
        an opening extending between the second side of the second lower side wall and the second side of the third lower side wall, the opening facing the first lower side wall;

a battery unit accommodated in the lower case and including a plurality of battery cells;

an upper case arranged to face the lower case so as to seal the battery unit, the upper case including side walls with an increasing height in a direction oriented from the first lower side wall of the lower case toward the opening;

a first ventilation part through the first lower side wall of the lower case, the first ventilation part being at a first height based on the bottom surface; and a second ventilation part through a side wall of the upper case and facing the first ventilation part, the second ventilation part being at a second height greater than the first height based on the bottom surface.

2. The battery pack of claim 1, wherein the upper case includes:

a first upper side wall extending from a top surface, a second upper side wall and a third upper side wall respectively connected with the first upper side wall and arranged to face each other, the second and third upper side walls having the increasing height, a fourth upper side wall arranged to face the first upper side wall, wherein the first upper side wall and the first lower side wall, the second upper side wall and the second lower side wall, and the third upper side wall and the third lower side wall are arranged to be engaged with one another, wherein shapes of the second upper side wall and the third upper side wall are complementary with respect to shapes of the second lower side wall and the third lower side wall, respectively, and wherein at least part of the fourth upper side wall is arranged to face and overlap the first lower side wall.

3. The battery pack of claim 1, wherein the lower case and the upper case are coupled to each other via a fastening member.

4. The battery pack of claim 3, wherein the fastening member includes a first fastening member located at an end of the lower case, and a second fastening member located at an end of the upper case in a position corresponding to the first fastening member.

5. The battery pack of claim 1, wherein:

the second lower side wall and the third lower side wall have a decreasing stepped shape oriented from the first lower side wall toward the opening, and the second upper side wall and the third upper side wall have a stepped shape complementary with respect to that of the second lower side wall and the third lower side wall.

6. The battery pack of claim 1, wherein the lower case includes no side wall between the second side of the second lower side wall and the second side of the third lower side wall.

7. The battery pack of claim 1, wherein:

the second lower side wall includes a first area, a second area, a third area, and a fourth area in order from one side of the second lower side wall, and the first area and the third area have a uniform height, and a first height of the first area is greater than a third height of the third area.

8. The battery pack of claim 7, wherein the second area has a second height, and the second height has an inclination gradually decreasing from one side of the second area contacting the first area to the other side of the second area contacting the third area.

9. The battery pack of claim 7, wherein the fourth area has a fourth height, and the fourth height has an inclination gradually decreasing from one side of the fourth area contacting the third area to the other side thereof.

10. The battery pack of claim 9, wherein the inclination of the fourth area is 35° to 55°.

11. The battery pack of claim 2, wherein a sum of a height of the first lower side wall of the lower case and a height of the first upper side wall of the upper case equals a height of the fourth upper side wall of the upper case.

12. The battery pack of claim 1, wherein a sealing member is inserted between the lower case and the upper case.

13. The battery pack of claim 1, further comprising a plurality of first ribs on the bottom surface inside the lower case and a plurality of second ribs each being between the plurality of first ribs, wherein a height of the plurality of second ribs is greater than a height of the plurality of first ribs.

14. The battery pack of claim 13, wherein each of the plurality of battery cells is inserted between the plurality of second ribs through forced fit and is seated on the plurality of first ribs.

15. The battery pack of claim 13, wherein each of the plurality of first ribs extends in parallel with the second lower side wall or the third lower side wall.

16. The battery pack of claim 13, wherein the plurality of second ribs are arranged at one side and another side of the plurality of first ribs, respectively, along a direction in which the plurality of first ribs extend, and are not arranged in a center of the plurality of first ribs.

17. The battery pack of claim 2, further comprising:

a plurality of bus bars located on one surface of the battery unit and connecting the plurality of battery cells, the plurality of bus bars facing the fourth upper side wall of the upper case; and a holder unit bent to have a preset angle so as to have a first holder member and a second holder member and arranged to cover at least two surfaces of the battery unit, each of the first holder member and the second holder member overlapping all the plurality of battery cells.

18. The battery pack of claim 17, wherein:

the first holder member is located on the plurality of bus bars, the first holder member being between the fourth side wall of the upper case and the plurality of bus bars, and the second holder member is located on a top surface of the battery unit, the second holder facing the top surface of the upper case.

19. The battery pack of claim 17, wherein each of the plurality of battery cells further includes a vent hole between the plurality of bus bars, and an insulating member is between the battery unit and the first holder member of the holder unit and includes an opening located in a position corresponding to the vent hole.

20. The battery pack of claim 18, wherein the holder unit further includes a projection member in the second holder member so as to press and fix the battery unit.

21. The battery pack of claim 18, wherein the holder unit further includes a ventilation member in the second holder member so as to dissipate heat discharged from the battery unit to the outside.

22. The battery pack of claim 17, wherein the upper case and the holder unit are apart from each other by a certain distance.

23. The battery pack of claim 17, further comprising a pressing member located on the top surface of the upper case and protruding toward the battery unit in a first direction perpendicular to the bottom surface.

24. The battery pack of claim 23, wherein the pressing member presses the battery unit in a second direction perpendicular to the first direction by contacting the holder unit.

25. The battery pack of claim 23, further comprising a support member located on a portion connecting the top surface of the upper case to the first upper side wall, being inserted into the battery unit and pressing the battery unit.

26. The battery pack of claim 25, wherein the pressing member presses the battery unit in the first direction, and the support member presses the battery unit in a second direction perpendicular to the first direction.

* * * * *